United States Patent
Zhou et al.

(10) Patent No.: US 11,937,164 B2
(45) Date of Patent: Mar. 19, 2024

(54) METHOD FOR PROCESSING DATA PACKETS AT NODE IN BLUETOOTH MESH NETWORK

(71) Applicant: ESPRESSIF SYSTEMS (SHANGHAI) CO., LTD., Shanghai (CN)

(72) Inventors: Yizan Zhou, Shanghai (CN); Swee Ann Teo, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 282 days.

(21) Appl. No.: 17/436,757

(22) PCT Filed: Feb. 25, 2020

(86) PCT No.: PCT/CN2020/076639
§ 371 (c)(1),
(2) Date: Sep. 7, 2021

(87) PCT Pub. No.: WO2020/177580
PCT Pub. Date: Sep. 10, 2020

(65) Prior Publication Data
US 2022/0182915 A1    Jun. 9, 2022

(30) Foreign Application Priority Data
Mar. 6, 2019   (CN) .......................... 201910169002.6

(51) Int. Cl.
*H04L 12/26* (2006.01)
*H04W 40/12* (2009.01)
(Continued)

(52) U.S. Cl.
CPC ............ *H04W 40/12* (2013.01); *H04W 40/24* (2013.01); *H04W 4/80* (2018.02); *H04W 84/18* (2013.01)

(58) Field of Classification Search
CPC ....... H04W 40/12; H04W 40/24; H04W 4/80; H04W 84/18; H04W 48/00; H04W 40/16; H04L 61/00
See application file for complete search history.

(56) References Cited

U.S. PATENT DOCUMENTS

| 6,810,259 B1 * | 10/2004 | Zhang ..................... H04W 8/18 |
| | | 711/119 |
| 2004/0068562 A1 * | 4/2004 | Tilton ................. H04L 63/1416 |
| | | 709/225 |

(Continued)

FOREIGN PATENT DOCUMENTS

| GB | 2512781 A | 10/2014 |
| WO | WO 2014/053152 A1 | 4/2014 |

OTHER PUBLICATIONS

International Search Report from WO 2020/177580 A1 dated Apr. 28, 2020.
(Continued)

*Primary Examiner* — Zewdu A Beyen
(74) *Attorney, Agent, or Firm* — Aird & McBurney LP

(57) ABSTRACT

A method for processing a data packet at a node in a Bluetooth Mesh network, comprising: (a) determining a one-hop device cache list of the node, wherein the one-hop device cache list comprises an address of one or more one-hop nodes; (b) when the node sends a data packet, checking whether a destination address of the data packet is the same as an address stored in the one-hop device cache list; if yes, setting a TTL value of the data packet to 0 and sending the data packet; otherwise, setting the TTL value of the data packet to be greater than a specified TTL threshold, (Continued)

and sending the data packet; and (c) when the node forwards a data packet, checking whether the destination address of the data packet is the same as an address stored in the one-hop device cache list; if yes, setting the TTL value of the data packet to 1 and forwarding the data packet; otherwise, deducting the TTL value of the data packet by 1 and forwarding the data packet. According to the present disclosure, the problem of signal interference in a dense Bluetooth Mesh network may be significantly reduced.

8 Claims, 2 Drawing Sheets

(51) Int. Cl.
*H04W 40/24* (2009.01)
*H04W 4/80* (2018.01)
*H04W 84/18* (2009.01)

(56) References Cited

U.S. PATENT DOCUMENTS

| | | | | |
|---|---|---|---|---|
| 2009/0034538 | A1* | 2/2009 | Sato | H04L 12/40013 370/400 |
| 2013/0148547 | A1* | 6/2013 | Page | H04L 67/12 370/255 |
| 2017/0078454 | A1* | 3/2017 | Berookhim | H04W 8/18 |
| 2018/0048666 | A1* | 2/2018 | Alderson | H04L 45/20 |

OTHER PUBLICATIONS

Office Action and Search Report from corresponding Chinese Application No. 201910169002.6 dated Apr. 20, 2020.
CN109862548B-CN Priority (with EN cover page).
CN109862548A cited in ISR (with EN cover page).
CN109618321A cited in ISR (with EN cover page).
CN108449774A cited in ISR (with EN cover page).
CN106688209A cited in Chinese Office Action dated Apr. 20, 2020 (with EN cover page).
CN105491508A cited in ISR (with EN cover page).
CN103781148A cited in Chinese Office Action dated Apr. 20, 2020 (with EN cover page).
CN103560966A-cited in Chinese Office Action dated Apr. 20, 2020 (with EN cover page).
CN101369982A—cited in Chinese Office Action dated Apr. 20, 2020 (with EN cover page).
CN101083629A—cited in Chinese Office Action dated Apr. 20, 2020 (with EN cover page).
CN1581813A—cited in ISR (with EN cover page).

* cited by examiner

METHOD FOR PROCESSING DATA PACKETS AT NODE IN BLUETOOTH MESH NETWORK

TECHNICAL FIELD

The present disclosure relates to a Bluetooth Mesh network, and in particular to a method for processing a data packet at a node in a Bluetooth Mesh network.

BACKGROUND ART

Bluetooth Mesh publishes and relays message data (or messages for short) in the way of "Network Flooding", which means that there is not a fixed transmission path of messages and routing table information does not need to be saved in nodes. Since all other nodes within the transmission range of a node may receive the message, the nodes with relay function may continue to forward the message to all other nodes within the transmission range.

"Flooding Network" may cause a problem that when the distance between nodes is relatively close in a dense network, the same message may be forwarded by multiple relay nodes so that each node may receive a large number of duplicate data packets. The dense network may be, for example, a network where all devices or a large number of devices are within one-hop range of each other.

By way of an example in FIG. 1, it is assumed that nodes B, C and D are within the communication range of node A, node F is not within the communication range of node A but may receive a data packet sent by node A and relayed by nodes B, C and D; as a result, node F may receive the data packets relayed from nodes B, C and D. Certainly, if one of nodes B, C and D does not receive the data packet, it may not relay the data packet. Sometimes, for the purpose of making the Mesh network more robust, relay nodes may continuously retransmit multiple data packets. For example, when node A sends a data packet PDU to node F, node C may continuously forward the same data packet PDU several times (e.g., three times) after receiving it; similarly, nodes B and C may also continuously forward the data packet several times after receiving it.

According to the aforementioned analysis, if nodes B, C and D all receive and forward the data packet, the number of duplicate data packets received by node F may be as many as 3*3=9.

In addition, according to the prior art, in a Bluetooth Mesh network shown in FIG. 1, data packets sent from node A to node B may also be forwarded via C or D to F and then to B, thus generating a lot of unnecessary forwarding traffic and signal interference in the network.

In the existing mechanism of the Bluetooth Mesh network, the lifetime of data packets in the network is controlled by setting a TTL (Time To Live) value. All Bluetooth Mesh data packets include a TTL field, which is used to limit the hop count of message relayed and forwarded. each data packet includes an initial TTL value when being sent. After receiving the data packet, the relay node may first check whether the TTL is greater than 1 and may relay and forward the data packet only if the TTL is greater than 1. The relay node may deduct the TTL value by 1 before forwarding a data packet. If the TTL value is detected to be less than or equal to 1, it may be regarded as the end of the lifetime of the data packet and the relay node may not forward the data packet further.

However, when the above mechanism is applied, especially in the dense networks, if a data packet is still in its lifetime, it may still be repeatedly forwarded by different nodes several times, which may still lead to serious signal interference and communication channel occupation.

Therefore, there is a need in the art for a method to eliminate or reduce unnecessary data packet forwarding, relevant communication traffic and signal interference in a Bluetooth Mesh networks, especially in a dense Bluetooth Mesh networks). It should be understood that the technical problems listed above are only examples rather than restrictions on the present disclosure, and the present disclosure is not limited to the technical solutions for solving all of the above-described technical problems at the same time. The technical solutions of the present disclosure may be implemented to solve one or more of the above-described or other technical problems.

SUMMARY OF THE INVENTION

An object of the present disclosure is to solve the technical problem of signal interference in a dense Bluetooth Mesh network.

To achieve such object, the present disclosure provides a method for processing a data packet at a node in a Bluetooth Mesh network, which comprises the following steps: (a) determining a one-hop device cache list of the node, wherein the one-hop device cache list comprises an address of each of one or more one-hop nodes of the node; (b) when the node sends a data packet, checking whether a destination address of the data packet is the same as an address stored in the one-hop device cache list; if yes, setting a TTL value of the data packet to 0 and sending the data packet; otherwise, setting the TTL value of the data packet to be greater than a specified TTL threshold, and sending the data packet; and (c) when the node forwards a data packet, checking whether the destination address of the data packet is the same as an address stored in the one-hop device cache list; if yes, setting the TTL value of the data packet to 1 and forwarding the data packet; otherwise, deducting the TTL value of the data packet by 1 and forwarding the data packet.

Optionally, determining the one-hop device cache list of the node in step (a) includes: if a RSSI (Received Signal Strength Indicator) value of the data packet received by the node from another node is greater than a specified RSSI threshold, adding an address of the another node to the one-hop device cache list of the node.

Optionally, determining the one-hop device cache list of the node in step (a) further includes: if an original TTL value of the data packet received by the node from another node is the same as a TTL value when the data packet arrives at the node, adding an address of the another node to the one-hop device cache list of the node.

Optionally, determining the one-hop device cache list of the node in step (a) further includes: determining whether to add an address of another node to the one-hop device cache list of the node according to a mobility state of the another node.

Optionally, determining the one-hop device cache list of the node in step (a) further includes: if a TTL value of the data packet received by the node from another node is 0, adding an address of the another node to the one-hop device cache list of the node.

Optionally, the address is a Bluetooth Mesh unicast address or a Bluetooth MAC address.

Optionally, determining the one-hop device cache list of the node in step (a) includes: if an original TTL value of the data packet received by the node from another node is greater than a TTL value when the data packet arrives at the node and an address of the another node exists in the one-hop device cache list of the node, deleting the address of the another node from the one-hop device cache list of the node.

Optionally, determining the one-hop device cache list of the node in step (a) includes: if the node does not receive a heartbeat packet from another node within a specified time and an address of the another node exists in the one-hop device cache list of the node, deleting the address of the another node from the one-hop device cache list of the node.

The method of the present disclosure may effectively solve or mitigate the problem of signal interference in a Bluetooth Mesh network, especially in a dense Bluetooth Mesh network.

DETAILED DESCRIPTION OF THE PREFERRED EMBODIMENTS

The method of the present disclosure may be described in detail with reference to the accompanying drawings and specific embodiments. It should be understood that the embodiments shown in the accompanying drawings and described below are merely illustrative and not limiting the present disclosure.

Figure 1:
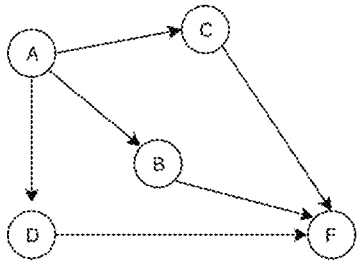
FIG. 1 is a schematic diagram of data packet transmission and forwarding between nodes in a Bluetooth Mesh network.
Figure 2:
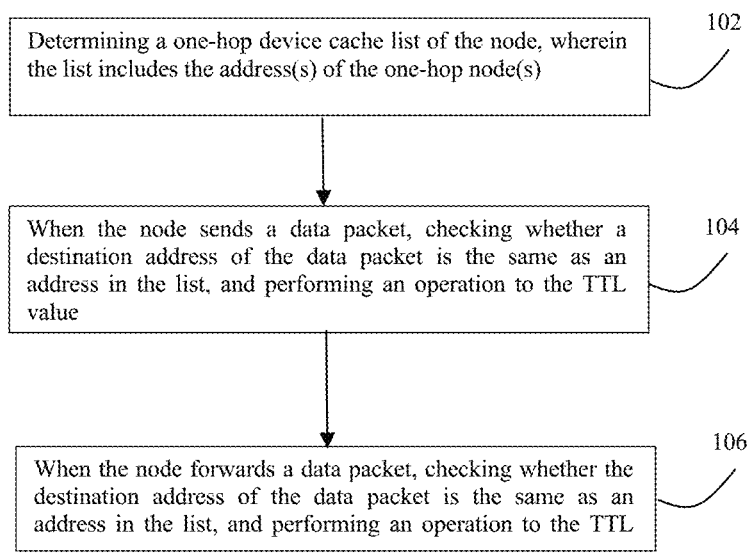
FIG. 2 is a schematic flow chart of the method of the present disclosure.

As a non-limiting example, as shown in FIG. 2, the present disclosure provides a method for processing a data packet at a node in a Bluetooth Mesh network, which includes the following steps. In step 102, a one-hop device cache list of the node is determined. The one-hop device cache list may include an address of each of one or more one-hop nodes of the node. In step 104, when the node forwards a data packet, whether a destination address of the data packet is the same as an address stored in the one-hop device cache list is checked; if yes, a TTL value of the data packet is set to 0 and the data packet is sent; otherwise, the TTL value of the data packet is set to be greater than a specified TTL threshold, and the data packet is sent. In step 106, when the node forwards a data packet, whether the destination address of the data packet is the same as an address stored in the one-hop device cache list is checked; if yes, the TTL value of the data packet is set to 1 and the data packet is forwarded; otherwise, the TTL value of the data packet is deducted by 1 and the data packet is forwarded. It should be understood that in the context of the present disclosure, a "one-hop node" or "one-hop device" refers to a node or device that is within communication range with respect to another node or device. In other words, the communication between one node or device and its one-hop node or one-hop device may be directly carried out in a Bluetooth Mesh network without forwarding.

In step 102, determining a one-hop device cache list of the node may include, for example, adding a node address to the list and deleting a node address from the list. It should be understood that the one-hop device cache list provided by the present disclosure is a dynamic list, and may be dynamically updated according to adding or removing, mobility and signal strength of nodes in the network.

Regarding adding a node to the network, in one embodiment of the present disclosure, if a RSSI value of the data packet received by the node from another node is greater than the specified RSSI threshold, the address of another node is added to the one-hop device cache list of the node, because another node is considered to fall within one-hop range when the RSSI value is relatively high.

In another embodiment of the present disclosure, if an original TTL value of the data packet received by the node from another node is the same as a TTL value when the data packet arrives at the node, the address of the another node is added to the one-hop device cache list of the node. The reason lies in that, if the original TTL value is the same as the received TTL value, this indicates that the data packet has not been forwarded but directly arrived at the device/node, and thus may be included in the one-hop range.

In a third embodiment of the present disclosure, whether the address of another node is added to the one-hop device cache list of the node may be determined according to a mobility state of the another node. For example, when one node in the one-hop device cache list is determined as a fixed device, the detection frequency of a heartbeat packet of the node may be correspondingly reduced, and thus there is no need for the device sending the heartbeat packet frequently. If one node is determined to be moving frequently, the node, even within one-hop range, may not be added to the one-hop device cache list. For example, in one exemplary embodiment, under the same conditions but the another node is a relatively fixed device such as a television or a lamp, its node address may be added to the one-hop device cache list; whereas, if the another node is a device that moves frequently such as a sweeper, its node address may not be added to the one-hop device cache list.

In a fourth embodiment of the present disclosure, the address of another node is added to the one-hop device cache list of the node if the TTL value of the data packet received by the node from the another node is 0.

In addition, in step 104 described above, the TTL threshold may be set according to the size of the Bluetooth Mesh network. If the size of the network is unknown, the TTL threshold may be set to a correspondingly larger value to ensure the successful transmission of data packets. Though the setting in step 104, when the destination address device falls within the one-hop range of the source device that sends the data packet, the source device may set the TTL to 0. Therefore, the data packet may only be sent to the nodes within the one-hop range of the source device rather than being continuously spread and relayed to further nodes. That may effectively reduce signal interference and improve data transmission efficiency. In another aspect, as described in step 106, when the relay node detects that the destination address device of the relayed data packet is within the one-hop range of itself, the relay node may set the TTL to 1 and forward the data packet. Therefore, the data packet may only be forwarded to the nodes within the one-hop range of the relay node rather than being continuously spread and relayed to further nodes. Similarly, in this way, it may effectively reduce signal interference and improve data transmission efficiency.

The methods described above for adding nodes to the one-hop device cache list may be used simultaneously or with one or more being selected from them.

In another aspect, regarding deleting a node address from the one-hop device cache list, in one embodiment, the address of another node is deleted from the one-hop device cache list of the node if the original TTL value of the data packet received by the node from the another node is greater than the TTL value when the data packet arrives at the node and the address of the another node exists in the one-hop device cache list of the node. In another embodiment, if the node does not receive the heartbeat packet from another node within the specified time and the address of the another node exists in the one-hop device cache list of the node, the address of the another node is deleted from the one-hop device cache list of the node.

In practical applications, the node address may be either a Bluetooth Mesh unicast address or a Bluetooth MAC (Media Access Control) address.

Through the adopted technical means, for example, establishing a one-hop device cache list for a Bluetooth Mesh network, the method of the present disclosure may greatly reduce the amount of duplicate data packets forwarded over the air, and thus effectively reduce the signal interference in a Bluetooth Mesh network, especially in a dense Bluetooth Mesh network.

Figure 3:
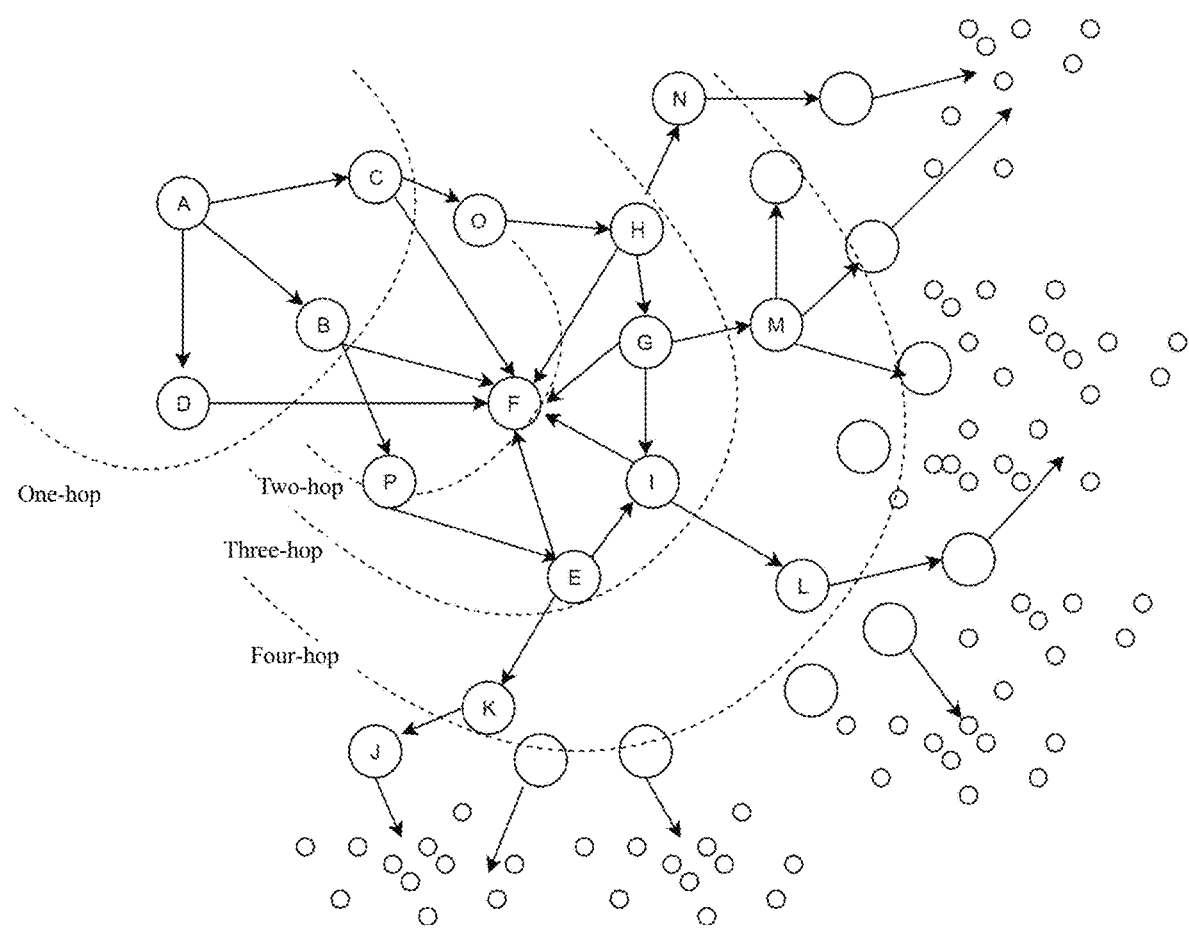
FIG. 3 is a schematic diagram of a Bluetooth Mesh network data packet transmission by the method of the present disclosure.

The implementation and effects of the present disclosure may now be further described in combination with examples below. FIG. 3 illustrates a more complex Bluetooth Mesh network topology. Node A intends to send a data packet to node F which is not within the one-hop range of node A (i.e., the address of node F is not in the one-hop device cache list of node A). In this case, the TTL threshold may be set to, for example, 99, and the TTL value may be set to 100. Thereafter, if nodes B, C and D all find node F is within their one-hop ranges, nodes B, C and D may set the TTL value of the data packet to 1 and then forward the data packet. Next, nodes F, O, and P may receive the data packet from nodes B, C, and D. If nodes O and P find the TTL value in the data packet is 1, nodes O and P may not continuously forward the data packet. If node F finds that the data packet is for itself (i.e., a destination node of the data packet), node F may not continuously forward the data packet, and the data transmission ends here. Hence, further nodes such as nodes H, N and M will no longer receive the data packet nor forward the data packet to even further nodes, while node F only receives data forwarded by nodes B, C and D. Therefore, the total volume of forwarded data packets may be greatly reduced.

In contrast, if the processing approaches of the prior art instead of the method of the present disclosure is used in the Bluetooth Mesh network, it may result in that an extremely large number of data packets may be forwarded repeatedly. For example, when node A intends to send data to node F without knowing the network size and the location of node F, a larger TTL value, e.g., 100, may be set. Thereafter, it is assumed that the data packet sent by node A is received and forwarded by nodes B, C and D, the TTL value may be deducted by 1 to be 99. Next, nodes F, O, and P may receive the data packet forwarded by nodes B, C, and D, after node F finds that the data packet is for itself, node F may not continuously forward the data packet. However, when nodes O and P find that the data pack is not for itself, they may continuously forward the data packet, and the TTL value continues to be deduct by 1 to be 98. Thereafter, nodes H and E receive the data packet forwarded by nodes O and P correspondingly, and then continuously forward the data packet, the TTL value is reduced to be 97. the data packet forwarded by node H may not only be received by node F, but also be received by node G, and node G continues to forward the data packet to a further place. Meanwhile data forwarded by node E may not only be received by node F, but also be received by node I, and node I continues to forward the data to a further place.

Therefore, through the above analysis, if adopting the existing approaches, node F may receive data packets forwarded by nodes B, C and D, data packets forwarded by surrounding nodes O and P, and data packets forwarded by nodes H, G, I and E behind node F. If there are a large number of nodes around node F, node F may receive a large number of data packets forwarded by other nodes, which may cause serious air signal interference. Meanwhile, the forwarding of the data packet may not be stopped near a destination address device, and the data packet may be relayed and forwarded to a further network. Eventually, every device in the network receives and forwards the data packet, the data packet however useless to other nodes in the network, which may instead result in a large number of redundant data interfering channels in the whole network. As mentioned above, these problems have been effectively solved by the solution of the present disclosure.

Although various embodiments in different aspects of the present disclosure have been described for the purpose of the present disclosure, it should be understood that the teaching of the present disclosure are not limited thereto. The features disclosed in one embodiment are not limited thereto but may be combined with features disclosed in other embodiments. For example, one or more features and/or operations of the method of the present disclosure described in one embodiment may also be applied separately, in combination or as a whole to another embodiment. It should be further understood that the above-described method steps may be executed sequentially or in parallel, combined into fewer steps, divided into more steps, or combined and/or eliminated in a different way than that described herein and/or eliminated. It should be understood by those skilled in the art that there are still more alternative embodiments and variants thereof, and various changes and modifications may be made to the above method steps without departing from the scope defined by the claims of the present disclosure.

The invention claimed is:

1. A method for processing a data packet at a node in a Bluetooth Mesh network, comprising:
   (a) determining a one-hop device cache list of the node, wherein the one-hop device cache list comprises an address of each of one or more one-hop nodes of the node, wherein each of the one or more one-hop nodes of the node is capable of communicating with the node directly without forwarding in the Bluetooth Mesh network;
   (b) when the node sends a data packet, checking whether a destination address of the data packet is the same as an address stored in the one-hop device cache list;
      if yes, setting a TTL value of the data packet to 0 and sending the data packet; otherwise, setting the TTL value of the data packet to be greater than a specified TTL threshold, and sending the data packet; and
   (c) when the node forwards a data packet, checking whether the destination address of the data packet is the same as an address stored in the one-hop device cache list;
      if yes, setting the TTL value of the data packet to 1 and forwarding the data packet; otherwise, deducting the TTL value of the data packet by 1 and forwarding the data packet.

2. The method according to claim 1, wherein determining the one-hop device cache list of the node in step (a) comprises:

if a RSSI value of the data packet received by the node from another node is greater than a specified RSSI threshold, adding an address of the another node to the one-hop device cache list of the node.

3. The method according to claim 1, wherein determining the one-hop device cache list of the node in step (a) comprises:
if an original TTL value of the data packet received by the node from another node is the same as a TTL value when the data packet arrives at the node, adding an address of the another node to the one-hop device cache list of the node.

4. The method according to claim 1, wherein determining the one-hop device cache list of the node in step (a) comprises:
determining whether to add an address of another node to the one-hop device cache list of the node according to a mobility state of the another node.

5. The method according to claim 1, wherein determining the one-hop device cache list of the node in step (a) comprises:
if a TTL value of the data packet received by the node from another node is 0, adding an address of the another node to the one-hop device cache list of the node.

6. The method according to claim 1, wherein the address is a Bluetooth Mesh unicast address or a Bluetooth MAC address.

7. The method according to claim 1, wherein determining the one-hop device cache list of the node in step (a) comprises:
if an original TTL value of the data packet received by the node from another node is greater than a TTL value when the data packet arrives at the node and an address of the another node exists in the one-hop device cache list of the node, deleting the address of the another node from the one-hop device cache list of the node.

8. The method according to claim 1, wherein determining the one-hop device cache list of the node in step (a) comprises:
if the node does not receive a heartbeat packet from another node within a specified time and an address of the another node exists in the one-hop device cache list of the node, deleting the address of the another node from the one-hop device cache list of the node.

* * * * *